United States Patent [19]

Barone

[11] Patent Number: 4,494,670
[45] Date of Patent: Jan. 22, 1985

[54] REMOVABLE FREEZE PLUG

[76] Inventor: Sam A. Barone, 1205 Ryson, Wheaton, Ill. 60187

[21] Appl. No.: 526,652

[22] Filed: Aug. 26, 1983

[51] Int. Cl.³ .......................................... B65D 53/04
[52] U.S. Cl. .................................................. 220/235
[58] Field of Search ...................... 220/235, 236, 237; 215/360

[56] References Cited

U.S. PATENT DOCUMENTS

| 996,461 | 6/1911 | Costa | 220/236 |
| 1,949,498 | 3/1934 | Stone | 220/235 |
| 3,361,288 | 1/1968 | Dorman | 220/235 |
| 3,430,801 | 3/1969 | Homrig | 220/237 |
| 3,901,167 | 8/1975 | Reese | 220/235 |

FOREIGN PATENT DOCUMENTS

| 500042 | 4/1928 | Fed. Rep. of Germany | 220/236 |
| 19835 | of 1900 | United Kingdom | 215/360 |

Primary Examiner—George E. Lowrance
Attorney, Agent, or Firm—Edmond T. Patnaude

[57] ABSTRACT

A core plug includes a shoulder which provides a fixed stop against which a expandable dished member is pressed to positively set the expanded diameter of the core plug.

3 Claims, 3 Drawing Figures

REMOVABLE FREEZE PLUG

The present invention relates in general to core plugs of the type used to seal the holes in the cast blocks of internal combustion engines, and it relates in particular to a new and improved core plug which may be removed from an engine block without damage so as to be subsequently replaced.

BACKGROUND OF THE INVENTION

Core plugs of the type to which the present invention relates are commonly referred to as freeze plugs and may be removed from the associate engine when it is to be stored at subfreezing temperatures. One such prior art freeze plug is described in U.S. Pat. No. 3,361,288. Ordinarily, such a plug cannot be removed from an engine block in which it has been mounted without the plug being destroyed. Also, the amount of expansion of that prior art core plug can vary substantially from one plug to the next wherefore damage to the plug can easily occur during installation thereof by inexperienced personnel.

Removal and replacement of freeze plugs in the engines of boats has been extremely difficult because of the relatively inaccessible location of the plugs on such engines. Therefore, it would be desirable to provide a new and improved freeze plug which could be easily removed without damage from a boat engine or the like

SUMMARY OF THE INVENTION

Briefly, there is provided in accordance with the present invention a new and improved, removable core plug assembly for use in sealing circular holes in engine blocks. In a preferred embodiment of the invention, positive stop means are incorporated in the plug for providing a precise amount of radial expansion of the plug. Also, means are incorporated in the plug to facilitate handling of the plug during installation thereof in an engine block.

GENERAL DESCRIPTION OF THE DRAWING

The present invention will be better understood by a reading of the following detailed description taken in connection with the accompanying drawing wherein.

DETAILED DESCRIPTION OF A PREFERRED EMBODIMENT OF THE INVENTION

Figure 1:
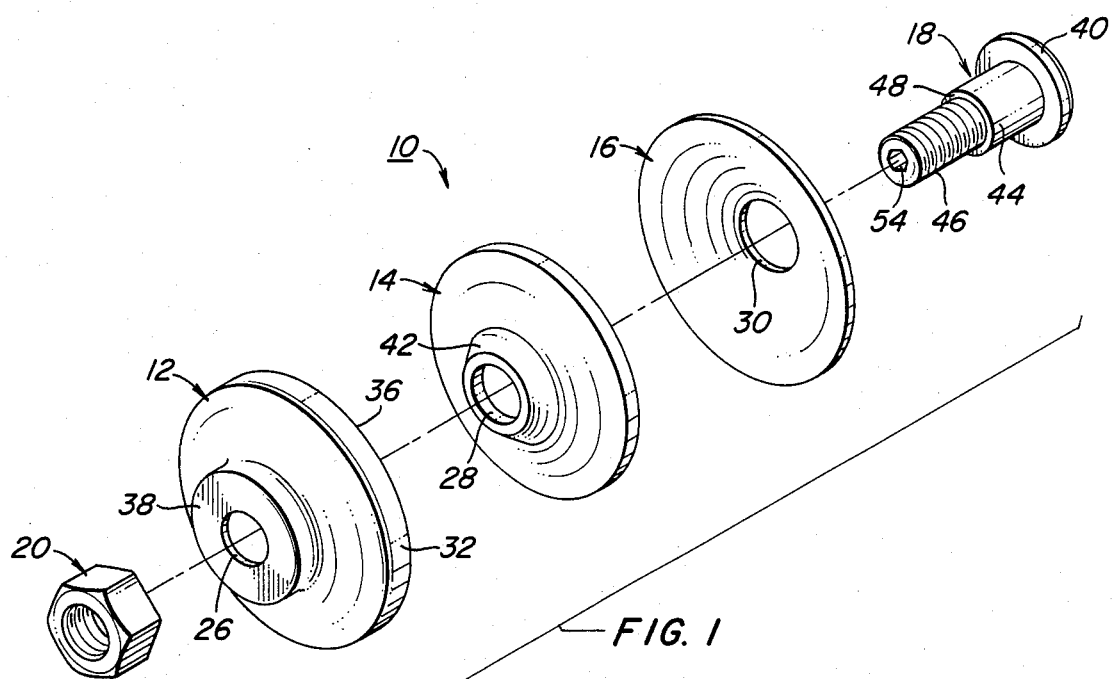
FIG. 1 is an exploded perspective view of a core plug embodying the present invention.
Figure 2:
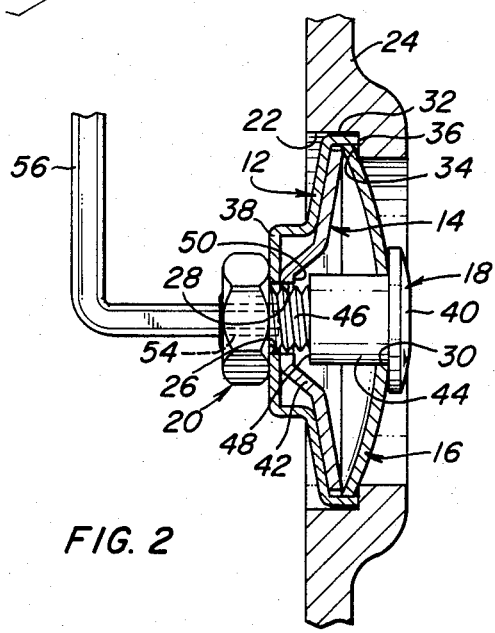
FIG. 2 is a cross-sectional view of the core plug shown in FIG. 1 during installation thereof in the block of an engine.
Figure 3:
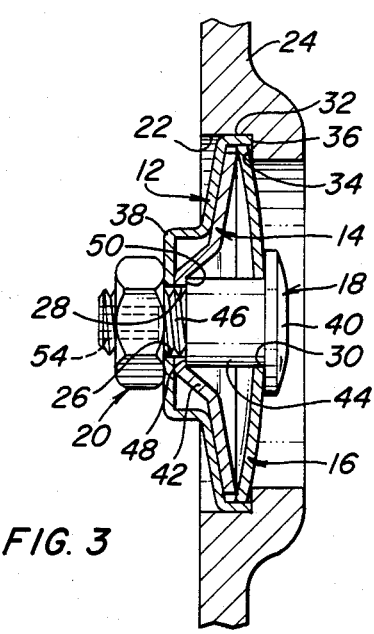
FIG. 3 is a cross-sectional view of the core plug shown in FIG. 1 after installation thereof in the block of an engine.

Referring to FIG. 1, a core plug 10 may be seen to consist of an outer shell 12, a brace disk 14, and expander disk 16, a headed bolt 18, and a nut 20 which is adapted to be threadedly fitted onto the threaded end of the bolt 18. The parts of the core plug assembly 10 are shown in FIG. 2 in their unstressed condition within a circular hole 22 in an engine block 24. The shell 12 and the disks 14 and 16 are respectively provided with centrally disposed, coaxially aligned openings 26, 28 and 30 through which the shank portion of the bolt 18 extends. The shell 12 is constructed of a soft metal such, for example, as copper, and it includes an annular rim portion 32 whose external diameter is slightly less than the diameter of the hole 22 in which the core plug is adapted to be assembled. As may be seen in FIGS. 2 and 3, the hole in the block 24 is counterbored so as to provide an outwardly facing annular shoulder 34, and it is against this shoulder that the edge 36 of the shell 12 is held during installation and thereafter. The body of the shell 12 is provided with a strengthening boss 38 through the center of which the hole 26 extends.

The expander disk 16 is concavo-convex, and its convex surface faces the head 40 of the bolt 18. The external diameter of the expander disk 16 is only slightly less than the internal diameter of the rim 32 so that a sliding fit is provided between the shell 12 and the disk 16 when the disk 16 is inserted into the rim 32. The expander disk 16 is formed of a relatively hard, flexible, resilient material such as steel which after being stressed will return substantially to its unstressed condition.

The brace disk 14 is disposed between the expander disk 16 and the interior of the shell 12 and its external diameter is appreciably less than the unstressed external diameter of the expander disk 16. The brace disk 14 is formed of a rigid metal material and includes a central boss portion 42 to prevent distortion of the disk 14 and of the central body portion of the shell 12 during installation of the plug and thereafter during use of the plug.

The bolt 18 has an unthreaded shank portion 44 immediately adjacent to the head 40 which extends through opening 30 in the disk 16. The external diameter of the shank portion 44 is substanially greater than the external diameter of the threaded portion 46 of the bolt 18 so as to provide an annular stop shoulder 48 which faces towards the brace disk 14. The parts of the core plug and dimensioned so that the distance between the shoulder 48 and an annular surface 50 on the expander disk 44 surrounding the opening 28 therein is held within close dimensional tolerances. Therefore, when the nut 20 is tightened onto the bolt 18 until the shoulder 48 abuts the brace disk 14, a precise, radial expansion of the expander disk 16 and the rim 32 has been achieved. Consequently, excessive tightening of the nut can be avoided wherefor stripping of the threads of the bolt or of the nut 20 does not take place and the nut 20 can, therefore, be unthreaded from the plug at a later date.

In order to prevent the bolt 18 from itself rotating when the nut 20 is being tightened thereon, the bolt 18 is provided with a noncircular axial blind hole 54 at its threaded end. In the illustrated embodiment of the invention, the hole 54 is hexagonal in shape so as to receive a conventional Allen wrench 56 as shown in FIG. 2. A particularly desirable feature of the core plug 12 is the fact that the use of an Allen wrench permits the installer to easily hold the plug assembly and manipulate it into place in the hole 22 even though the hole 22 may be located in a relatively inaccessible place. Once that the plug assembly 12 is positioned as shown in FIG. 2, an open end wrench may then be used to tighten the nut 20 onto the bolt 18 preventing rotation of the bolt 18 by means of the Allen wrench 56.

As the nut 20 is tightened onto the bolt 18, the center portion of the expander disk 16 is moved toward the brace disk 14 and the shell 12 while its outer rim expands radially outwardly to deform the rim 32 of the shell 12 and force it into tight sealing engagement with the wall of the hole 22 in the block 24. Also, during this tightening operation the head 18 of the bolt forms a hermetic seal with the abutting annular surface of the expander disk 16. The amount of expansion of the outer edge of the expander disk 16 and thus of the rim 32 of the shell 12 can thus be maintained within close tolerances wherefor a good hermetic seal can be effected from one plug to the next when the nut is tightened until the stop shoulder 48 abuts the brace disk 14. There is no need to measure the torque being applied or to attempt to count the number of turns or partial turns of the nut during the installation process.

When it becomes desirable to remove the core plug 10 from the engine block in which it is mounted, a wrench is inserted into the hole 54 in the end of the bolt 18 and an open end wrench is applied to the nut 20 to loosen it, thereby permitting the expander disk 16 to flex outwardly so that its outer edge moves radially inwardly toward the position shown in FIG. 2. Because of the relatively soft nature of the material from which the shell 12 is made, the plug can then be pulled out of the engine block 24 without damage to the plug. In some cases, working of the plug back and forth relative to the block is required to loosen it. However, once the nut 20 has been loosened, this is a relatively simple operation.

While the present invention has been described in connection with a particular embodiment thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. A core plug assembly for use in circular core holes in engine blocks, comprising in combination
    a shell having an annular rim portion,
    a concavo-convex expander disk having an external diameter which is slightly less than the internal diameter of said rim portion,
    said disk being disposed with said shell in coaxial relationship therewith with the concave side of said expander disk facing toward said shell,
    a rigid brace disk seated within said shell between said expander disk and the interior face of said shell,
    said shell, said side expander disk and said brace disk having mutually aligned, centrally disposed openings therethrough,
    a headed bolt extending through said openings with the head of said bold abutting the convex face of said expander disk,
    a nut threadedly disposed on the shank of said bolt adjacent to the exterior face of said shell,
    said bolt having a non-circular, axial blind hole in said shank at the end thereof opposite the head, said hole being sized to accept a complementary sized tool therein, and
    cooperating stop means on said bolt and on said brace disk for limiting the amount of movement of said head toward said shell as said nut is tightened onto said bolt.

2. A core plug assembly according to claim 1 wherein said cooperating stop means comprises
    an annular shoulder on the shank of said bolt, said shoulder facing toward brace disk.

3. A core plug assembly according to claim 1 wherein said hole is hexagonal in shape and is sized to receive a complementary sized Allen wrench therein.

* * * * *